United States Patent
Ozue et al.

(10) Patent No.: US 6,304,397 B1
(45) Date of Patent: Oct. 16, 2001

(54) MAGNETIC RECORDING/REPRODUCING APPARATUS WITH ROTARY DRUM WITH MAGNETORESISTANCE HEAD FOR TRANSDUCING DC-FREE CODE SIGNALS

(75) Inventors: Tadashi Ozue; Toshio Shirai; Takehiko Saito; Yoshiteru Kamatani, all of Kanagawa; Tomohiro Ikegami, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/319,509

(22) PCT Filed: Oct. 7, 1998

(86) PCT No.: PCT/JP98/04535

§ 371 Date: Aug. 2, 1999

§ 102(e) Date: Aug. 2, 1999

(87) PCT Pub. No.: WO99/18567

PCT Pub. Date: Apr. 15, 1999

(30) Foreign Application Priority Data

Oct. 7, 1997 (JP) .................................................... 9-274557
Jan. 6, 1998 (JP) .................................................. 10-001135

(51) Int. Cl.$^7$ .................................................... G11B 5/02
(52) U.S. Cl. ........................ 360/29; 360/271.1; 360/281; 360/64; 360/46; 360/53; 360/319
(58) Field of Search ................................... 360/270, 271, 360/271.1, 271.5, 29, 281, 64, 46, 40, 25, 65, 53, 313, 319

(56) References Cited

FOREIGN PATENT DOCUMENTS

| 2-46506 | 2/1990 | (JP) . |
| 9-251606 | 9/1997 | (JP) . |

*Primary Examiner*—Alan T. Faber
(74) *Attorney, Agent, or Firm*—Sonnenschein, Nath & Rosenthal (57) ABSTRACT

A helical scan magnetic recording/reproducing apparatus incorporating an MR head to serve as a reproducing magnetic head is arranged to convert data which is recorded on a magnetic tape into data in the form of DC-free code trains. The magnetic recording/reproducing apparatus is provided with a high-pass filter for attenuating low-frequency components of a reproduced signal detected by the MR head. Moreover, a demodulating circuit is provided which demodulates data in a state before data is converted into the DC-free code trains from the reproduced signal, in which the low-frequency components have been attenuated by said high-pass filter. As a result, noise (thermal asperities) in a low-frequency region caused when the magnetic tape and the MR head are brought into contact with each other is removed so that a reproduced output free from excessive noise is obtained. The high-pass filter is, for example, a rotary transformer mounted on rotational drum.

18 Claims, 9 Drawing Sheets

MAGNETIC RECORDING/REPRODUCING APPARATUS WITH ROTARY DRUM WITH MAGNETORESISTANCE HEAD FOR TRANSDUCING DC-FREE CODE SIGNALS

This application claims priority to Japanese Patent Applications 9-274557 filed Oct. 7, 1997 and 10-001135 filed Jan. 6, 1998.

The present invention relates to a helical scan magnetic recording/reproducing apparatus incorporating a magnetoresistance-effect magnetic head which serves as a reproducing magnetic head thereof.

Magnetic recording/reproducing apparatuses, such as video tape recorders, audio tape recorders and data storage systems for computers, each of which uses a magnetic tape which serves as a recording medium, are adapted to a helical scan method to raise the recording density so as to enlarge the capacity.

The magnetic recording/reproducing apparatuses of the foregoing type have been required to further raise the recording density and enlarge the capacity. To furthermore raise the recording density and enlarge the capacity, a method has been contrived which uses a helical scan magnetic recording/reproducing apparatus which incorporates a magnetoresistance-effect magnetic head (hereinafter called an "MR head") to serve as a reproducing magnetic head.

The MR head is a magnetic head incorporating a magnetoresistance effect device (hereinafter called an "MR device") which serves as a magnetic sensor for detecting a magnetic field of a recording medium. The MR head has been put into practical used as a reproducing magnetic head for a hard disc drive. In general, the MR head having sensitivity superior to that of an inductive-type magnetic head permits a great reproduction output to be obtained. When the MR head is employed as the reproducing magnetic head, a higher recording density and a larger capacity can be realized.

The hard disc drive incorporates the MR head mounted on a float slider to reproduce data in a state in which the MR head is floated on the magnetic disc. On the other hand, when the MR head is adapted to the helical scan method, data is reproduced from a magnetic tape in a state in which the MR head slides on the magnetic tape.

If the MR head slides on the magnetic tape, great variations in the reproduction output levels take place and noise is caused excessively in spite of great reproduction output obtainable from the MR head. Therefore, there arises a problem in that stable outputs cannot be obtained. Another problem arises in that any reproduced signal is not output, that is, dropouts frequency occur. Therefore, a helical scan magnetic recording/reproducing apparatus incorporating the MR head which serves as the reproducing magnetic head has not been put into practical use.

SUMMARY OF THE INVENTION

An object of the present invention is to provide a helical scan magnetic recording/reproducing apparatus incorporating an MR head which serves as a reproducing magnetic head and permitting stable reproduction outputs to be obtained.

A magnetic recording/reproducing apparatus according to the present invention is a helical scan magnetic recording/reproducing apparatus comprising an MR head mounted on a rotational drum; a high-pass filter; and demodulating means. The MR head is mounted on the rotational drum so that a reproduction signal is detected from a magnetic tape on which data converted into DC-free code trains has been recorded. The high-pass filter attenuates low-frequency components contained in the reproduction signal detected by the MR head. The demodulating means demodulates data in a state in which data has been converted into the DC-free code trains from the reproduction signal, the low-frequency components of which have been attenuated by the high-pass filter.

When data is reproduced from a magnetic tape by causing the magnetic tape and the MR head to slide each other, noise contained in the reproduced output from the MR head generally contains a multiplicity of low-frequency components. The magnetic recording/reproducing apparatus according to the present invention incorporates the high-pass filter which attenuates the low-frequency components contained in the reproduced signal detected by the MR head. Therefore, the magnetic recording/reproducing apparatus according to the present invention is able to efficiently remove noise contained in the reproduced signal detected by the MR head. Moreover, data which is reproduced by the magnetic recording/reproducing apparatus according to the present invention is data converted into the DC-free code trains. Therefore, data can reliably be reproduced if the high-pass filter attenuates the low-frequency component.

DETAILED DESCRIPTION OF THE PRESENTLY PREFERRED EMBODIMENTS

Embodiments of the present invention will now be described.

A magnetic recording/reproducing apparatus according to the present invention is a magnetic recording/reproducing apparatus which uses a magnetic tape as a recording medium. For example, the apparatus according to the present invention is employed as a video tape recorder, an audio tape recorder or a data storage system for a computer. The magnetic recording/reproducing apparatus according to the present invention is a helical scan magnetic recording/reproducing apparatus incorporating a rotational drum for recording/reproducing data. As a reproducing magnetic head mounted on the rotational drum, an MR head is employed.

Figure 1:
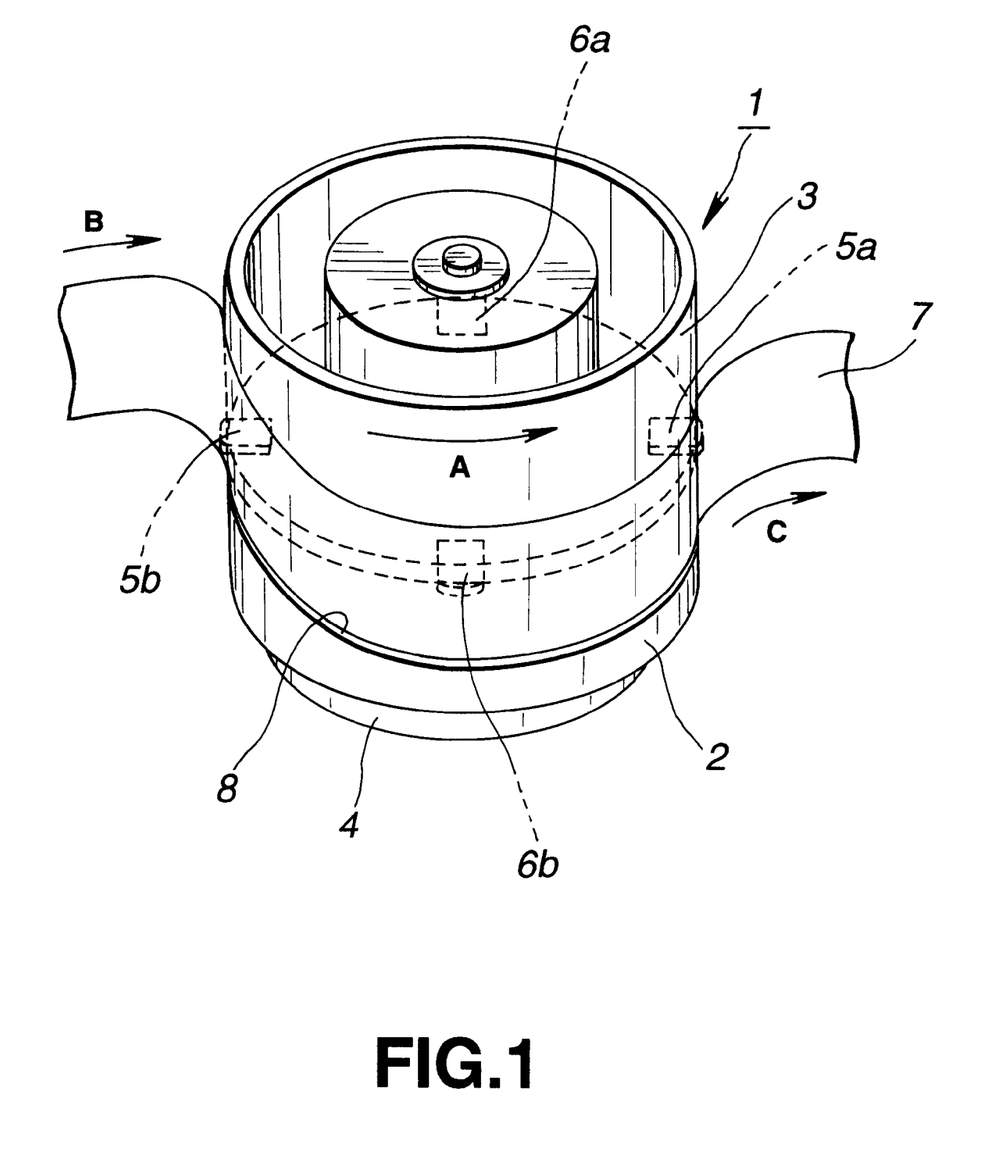
FIG. 1 is a perspective view showing an example of the structure of a rotational drum unit which is mounted on a magnetic recording/reproducing apparatus according to the present invention.
Figure 2:
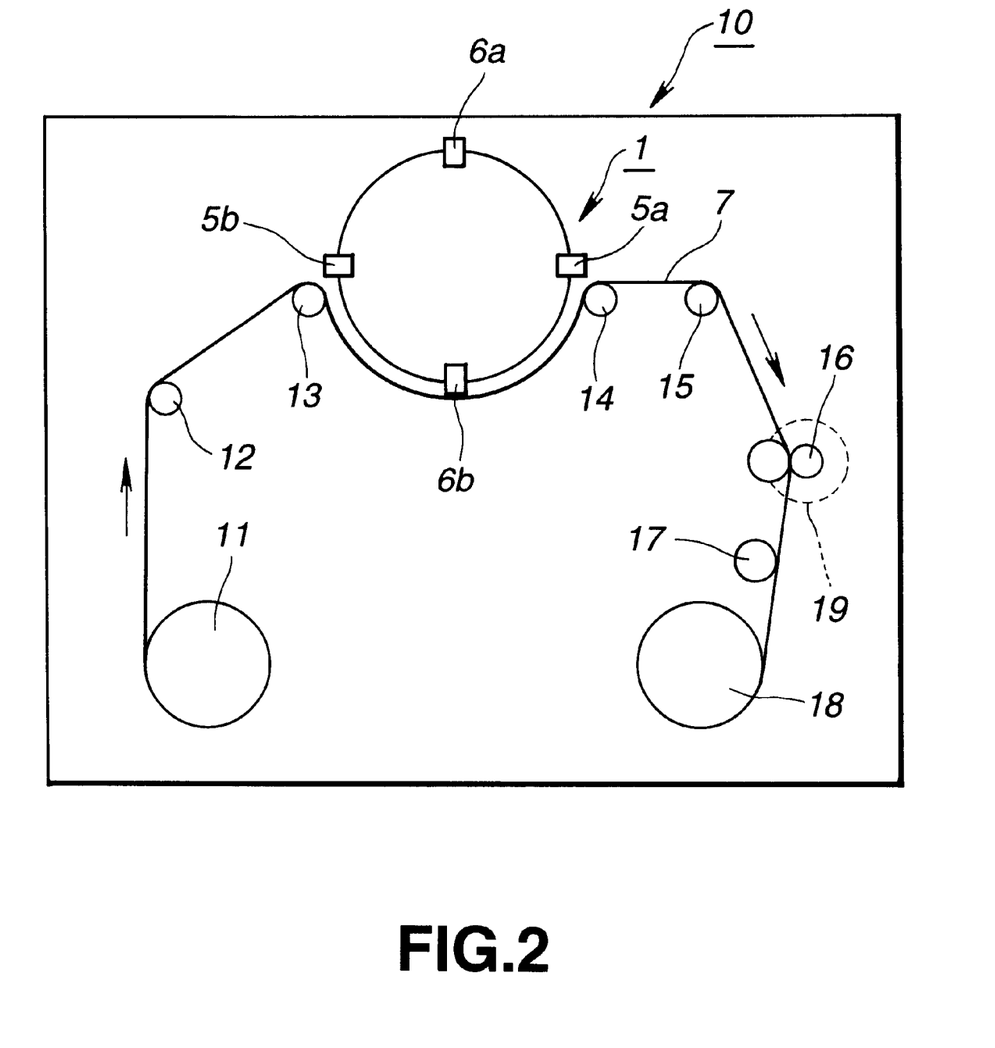
FIG. 2 is a plan view showing the schematic structure of an example of a magnetic-tape moving mechanism incorporating the rotational drum unit.

An example of the structure of a rotational drum unit which is mounted on the magnetic recording/reproducing apparatus according to the present invention is shown in FIGS. 1 and 2. FIG. 1 is a perspective view schematically showing the structure of a rotational drum unit 1. FIG. 2 is a plan view schematically showing a magnetic-tape moving mechanism 10 which includes the rotational drum unit 1.

As shown in FIG. 1, the rotational drum unit 1 incorporates a cylindrical stationary drum 2, a cylindrical rotational drum 3, a motor 4 for rotating the rotational drum 3, pairwise inductive magnetic heads 5a and 5b mounted on the rotational drum 3, and pairwise MR heads 6a and 6b mounted on the rotational drum 3.

Note that a so-called on-drum rotational drum unit 1 incorporating the rotational drum 3 mounted on the stationary drum 2 will now be described. The present invention may widely be applied to the helical scan magnetic recording/reproducing apparatus. Therefore, the type of the rotational drum unit is not limited. For example, a so-called intermediate-drum type rotational drum unit incorporating a rotational drum held by pairwise stationary drums may be employed.

The stationary drum 2 of the rotational drum unit 1 is a drum which is not rotated, that is, a drum which is held as described above. A lead guide portion 8 is formed in the side surface of the stationary drum 2 in a direction in which the magnetic tape 7 is moved. As described later, the magnetic tape 7 is moved along the lead guide portion 8 when a recording/reproducing operation is performed. The rotational drum 3 is disposed such that its central axis coincides with that of the stationary drum 2.

The rotational drum 3 is a drum which is rotated at predetermined rotational speed by the motor 4 when the operation for recording/reproducing the magnetic tape 7 is performed. The rotational drum 3 is formed into a cylindrical shape having substantially the same diameter as that of the stationary drum 2. The rotational drum 3 is disposed such that its central axis coincides with that of the stationary drum 2. The pairwise inductive magnetic heads 5a and 5b and the pairwise MR heads 6a and 6b are mounted on the surface of the rotational drum 3 opposite to the stationary drum 2.

Each of the inductive magnetic heads 5a and 5b is a recording magnetic head in which pairwise magnetic cores are joined to each other through a magnetic gap. Moreover, a coil is wound around the magnetic core. The inductive magnetic heads 5a and 5b are used when data is recorded on the magnetic tape 7. The inductive magnetic heads 5a and 5b are mounted on the rotational drum 3 such that an angle made by the inductive magnetic heads 5a and 5b with respect to the center of the rotational drum 3 is 180°.

Moreover, the magnetic gap portions of the inductive magnetic heads 5a and 5b project over the outer surface of the rotational drum 3. The inductive magnetic heads 5a and 5b are set to have opposite azimuth angles to perform guard-band-less recording of the magnetic tape 7 with a predetermined azimuth angle. It is preferable that the azimuth angle is 5° to 30°.

The foregoing inductive magnetic heads 5a and 5b may be known recording magnetic heads which have been employed in the conventional helical scan magnetic recording/reproducing apparatus. Specifically, it is preferable that a so-called MIG (Metal In Gap) magnetic head is employed which incorporates a magnetic core made of a soft magnetic material, such as ferrite, and a metal magnetic film formed on the soft magnetic material. Moreover, the pairwise magnetic cores are joined to each other such that metal magnetic films are positioned opposite to each other through a magnetic gap.

On the other hand, the MR heads 6a and 6b are reproducing magnetic heads incorporating MR devices serving as magnetic sensors for detecting a magnetic signal from the magnetic tape 7. The MR heads 6a and 6b are used when data is reproduced from the magnetic tape 7. The MR heads 6a and 6b are mounted on the rotational drum 3 such that the MR heads 6a and 6b make an angle of 180° from each other with respect to the center of the rotational drum 3. Moreover, the portions in which the MR devices are disposed project over the outer surface of the rotational drum 3. The MR heads 6a and 6b are structured to have opposite azimuth angles similarly to the inductive magnetic heads 5a and 5b in order to detect a magnetic signal guard-band-less recorded on the magnetic tape 7 with a predetermined azimuth angle.

The magnetic recording/reproducing apparatus records data on the magnetic tape 7 and reproduces data from the magnetic tape 7 by sliding the magnetic tape 7 on the rotational drum unit 1.

Specifically, when a recording/reproducing operation is performed, the magnetic tape 7 is fed from a feeding reel 11 to be wound around the rotational drum unit 1 through guide rollers 12 and 13, as shown in FIG. 2. Thus, the recording/reproducing operation is performed on the rotational drum unit 1.

When data is recorded on the magnetic tape 7, the pairwise inductive magnetic heads 5a and 5b and the magnetic tape 7 are relatively slid. Thus, the inductive magnetic heads 5a and 5b perform the guard-band-less recording operation. When data is reproduced from the magnetic tape 7, the pairwise MR heads 6a and 6b and the magnetic tape 7 are relatively slid. Thus, data recorded by the pairwise inductive magnetic heads 5a and 5b is reproduced by the MR heads 6a and 6b.

The magnetic tape 7 subjected to the recording/reproducing process by the rotational drum unit 1 is allowed to pass through guide rollers 14 and 15, a capstan 16 and a guide roller 17 so as to be moved to a wind-up roller 18. That is, the magnetic tape 7 is moved under a predetermined tension and at predetermined speed by the capstan 16 which is rotated by the capstan motor 19. Then, the magnetic tape 7 is brought into contact with the inductive magnetic heads 5a and 5b and the MR heads 6a and 6b which are mounted on the rotational drum 3 which is rotated so as to be slide under a predetermined contact pressure. Then, the magnetic tape 7 is wound around the wind-up roller 18.

As described above, the rotational drum unit 1 incorporates the capstan 16 which is rotated by the capstan motor 19 and which serves as a contact-pressure control means for controlling the contact pressure between the inductive magnetic heads 5a and 5b and the MR heads 6a and 6b and the magnetic tape 7.

When the magnetic tape 7 is moved as described above, the rotational drum 3 is rotated by the motor 4 as indicated by an arrow A shown in FIG. 1.

On the other hand, the magnetic tape 7 is moved along the lead guide portion 8 of the stationary drum 2 so as to be slid diagonally on the stationary drum 2 and the rotational drum 3. That is, the magnetic tape 7 is, as indicated by an arrow B shown in FIG. 1, moved in the predetermined direction of tape movement from the tape inlet portion along the lead guide portion 8 so as to be slid on the stationary drum 2 and the rotational drum 3. Then, the magnetic tape 7 is moved to the tape outlet portion, as indicated by an arrow C shown in FIG. 1.

When the MR heads 6a and 6b and the magnetic tape 7 are slid relatively during the operations of the MR heads 6a and 6b for reproducing data, the contact and sliding between the MR heads 6a and 6b and the magnetic tape 7 produce frictional heat. An influence of the frictional heat varies the temperatures of the MR heads 6a and 6b (hereinafter called "head temperatures"). In general, the MR devices mounted on the MR heads 6a and 6b have dependency on temperatures. If the head temperature is varied, noise is caused in the reproduction output. Noise caused from the variations of the head temperatures are called thermal asperities.

Figure 3:
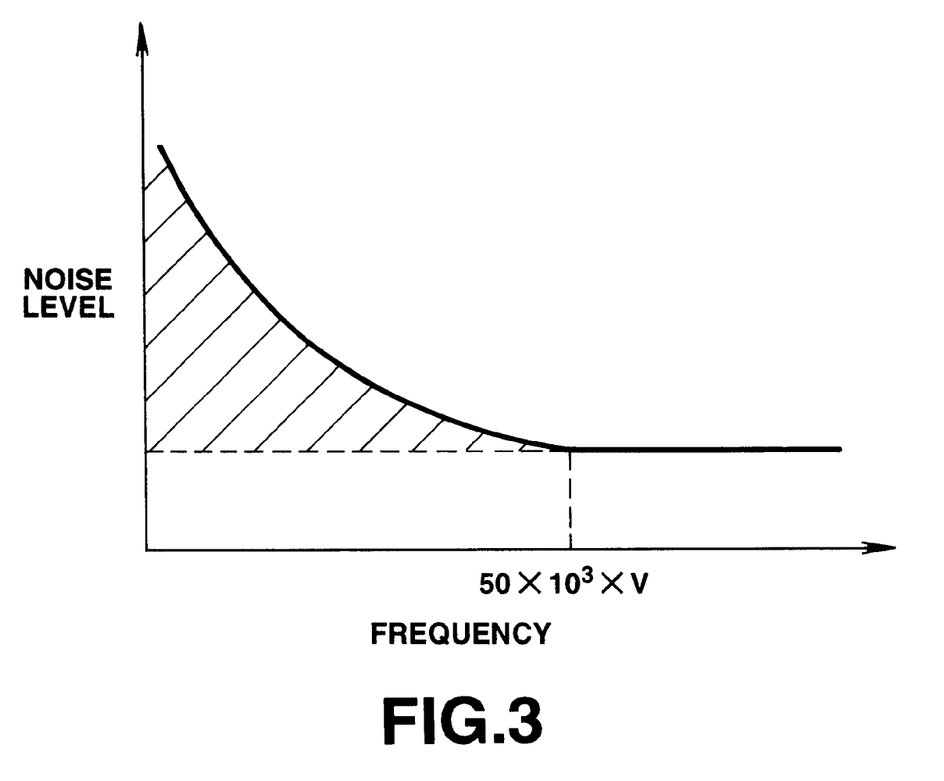
FIG. 3 is a graph showing an example of spectrum distribution of noise caused when data has been reproduced by causing an MR head and a magnetic tape to slide each other.

An example of spectrum distribution of noise which is caused when data has been reproduced by operating the MR heads 6a and 6b and the magnetic tape 7 to slide relatively is shown in FIG. 3. In FIG. 3, a diagonal line portion corresponds to the thermal asperities. As shown in FIG. 3, the thermal asperities are concentrated in the low frequency region. The reason for this lies in that the variations in the head temperatures are low frequency variations. Specifically, the thermal asperity region is not higher than a frequency expressed by $50 \times 10^3 [m^{-1}] \times V$ [m/s] on an assumption that the relative speed between the MR heads 6a and 6b and the magnetic tape 7 is V [m/s]. If the relative speed V between the MR beads 6a and 6b and the magnetic tape 7 is 10 m/s, the thermal asperity region is not higher than about 500 kHz.

As described later, the low-frequency components in the reproduced signal are attenuated so as to remove the thermal asperities and obtain a signal in which noise components have been reduced.

If foreign matter is introduced between the MR heads 6a and 6b and the magnetic tape 7 during data reproduction performed by relatively sliding the MR heads 6a and 6b and the magnetic tape 7, a so-called dropout occurs. As described later, this embodiment has the structure that an error correction process is performed to enable original data to be reproduced if missing of the reproduced signal occurs.

It is preferable that the rotational drum 3 of the above-mentioned rotational drum unit 1 has a diameter of about 10 mm to 60 mm. Moreover, the rotational speed of the rotational drum 3 is about 500 rpm to about 8000 rpm. The diameter and the rotational speed of the rotational drum 3 may arbitrarily be changed to meet a requirement from the system. If the diameter of the rotational drum 3 is large and the rotational speed is high, the relative speed between the inductive magnetic heads 5a and 5b and the MR heads 6a and 6b and the magnetic tape 7 is raised. As a result, the surfaces of the inductive magnetic heads 5a and 5b and the MR heads 6a and 6b, on which the magnetic tape is slid, are easily worn. Thus, the durability deteriorates. In particular, an influence of wear of the surfaces of the MR heads 6a and 6b on which the magnetic tape slides is easily exerted on the MR heads 6a and 6b. If the surface on which the magnetic tape slides is worn, the performance excessively deteriorates. Therefore, it is preferable that the diameter and the rotational speed of the rotational drum 3 are set to be values with which the MR heads 6a and 6b are able to have practically satisfactory durability and which satisfy the above-mentioned range.

The internal structure of the rotational drum unit 1 will now be described with reference to FIG. 4.

Figure 4:
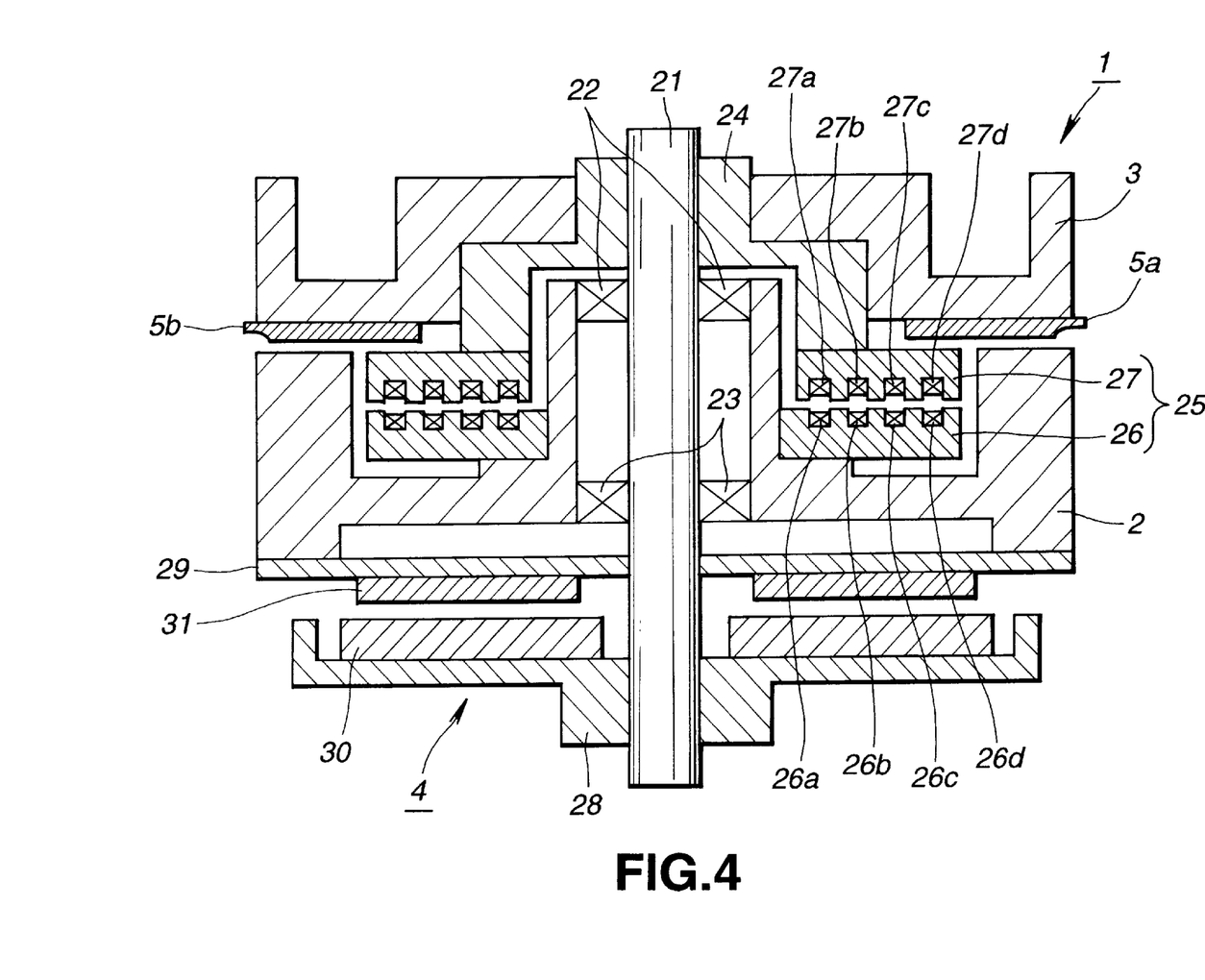
FIG. 4 is a cross sectional view showing the internal structure of the rotational drum unit.

As shown in FIG. 4, a rotational shaft 21 is inserted into the central portions of the stationary drum 2 and the rotational drum 3. Note that the stationary drum 2, the rotational drum 3 and the rotational shaft 21 are made of conductive materials so that the foregoing elements are electrically connected to one another. The stationary drum 2 is grounded.

Two bearings 22 and 23 are provided for the inside portion of a sleeve of the stationary drum 2. Thus, the rotational shaft 21 is supported rotatively with respect to the stationary drum 2. That is, the rotational shaft 21 is, by the bearings 22 and 23, rotatively supported with respect to the stationary drum 2. On the other hand, a flange 24 is provided for the inner portion of the rotational drum 3. The flange 24 is secured to the upper end of the rotational shaft 21. Thus, the rotational drum 3 can be rotated in synchronization with the rotation of the rotational shaft 21.

The rotational drum unit 1 accommodates a rotary transformer 25 which is a non-contact signal transmission unit for communicating a signal between the stationary drum 2 and the rotational drum 3. The rotary transformer 25 incorporates a stator core 26 joined to the stationary drum 2; and a rotor core 27 joined to the rotational drum 3.

The stator core 26 and the rotor core 27 are made of a magnetic material, such as ferrite, which is formed into annular shapes disposed around the rotational shaft 21. The stator core 26 is provided with pairwise signal-transmission rings 26a and 26b, which correspond to the pairwise inductive magnetic heads 5a and 5b, a signal-transmission ring 26c and an electric-power transmission ring 26d corresponding to the pairwise MR heads 6a and 6b. The foregoing rings are disposed concentrically. Similarly, the rotor core 27 is provided with pairwise signal-transmission rings 27a and 27b, which correspond to the pairwise inductive magnetic beads 5a and 5b, a signal-transmission ring 27c and an electric-power transmission ring 27d corresponding to the pairwise MR heads 6a and 6b. The foregoing rings are disposed concentrically.

The electric-power transmission rings 26d and 27d supply electric power required to operated the pairwise MR heads 6a and 6b. That is, the rotational drum unit 1 incorporates the electric-power transmission rings 26d and 27d of the rotary transformer 25 which constitute an electric-power supply means for supplying electric power to the MR heads 6a and 6b.

The rings 26a, 26b, 26c, 26d, 27a, 27b, 27c and 27d are annular coils wound around the rotational shaft 21. The rings 26a, 26b, 26c and 26d of the stator core 26 and the rings 27a, 27b, 27c and 27d of the rotor core 27 are disposed opposite to one another. The rotary transformer 25 transmits signals and electric power in a non-contact manner to and from the rings 26a, 26b, 26c and 26d of the stator core 26 and the rings 27a, 27b, 27c and 27d of the rotor core 27.

The rotary transformer 25 attenuates only the low-frequency components contained in the signal, which must be transmitted, and transmits only high-frequency components. That is, the rotary transformer 25 transmits the signals and electric power in the non-contact manner and as well as serves as a high-pass filter for attenuating the low-frequency components in the signal which must be transmitted. Therefore, the rotary transformer 25 also serves as the high-pass filter for attenuating the low-frequency components in the reproduced signal detected by the MR heads 6a and 6b. As a result, the thermal asperities contained in the reproduced signal detected by the MR heads 6a and 6b can be removed.

The motor 4 for rotating the rotational drum 3 is joined to the rotational drum unit 1. The motor 4 incorporates a rotor 28, which is a rotary portion, and a stator 29, which is a stationary portion. The rotor 28 is joined to the lower end of the rotational shaft 21 and provided with an operating magnet 30. On the other hand, the stator 29 is joined to the lower end of the stationary drum 2 and provided with an operating coil 31. When an electric current is passed to the operating coil 31, the rotor 28 is rotated. As a result, the rotational shaft 21 joined to the rotor 28 is rotated. In synchronization with the rotation, the rotational drum 3 secured to the rotational shaft 21 is rotated.

A recording/reproducing operation which is performed by the rotational drum unit 1 will now be described with reference to FIG. 5 which schematically showing the circuits of the rotational drum unit 1 and its peripheral circuits.

When the rotational drum unit 1 is operated to record data on the magnetic tape 7, an electric current is supplied to the operating coil 31 of the motor 4. Thus, the rotational drum 3 is rotated. In a state in which the rotational drum 3 is being rotated, a recording signal is supplied from the external circuit 40 to an encoder 41, as shown in FIG. 5.

The encoder 41, to which the recording signal has been supplied from the external circuit 40, encodes the recording signal and adds a predetermined error correction code. That is, the encoder 41 serves as an error-correction-code addition means for encoding the recording signal supplied from the external circuit 40 and adding the error correction code to data which must be recorded on the magnetic tape 7. Data, to which the error correction code has been added by the encoder 41, is supplied to a modulating circuit 42.

The modulating circuit 42 modulates data supplied from the encoder 41 into data in the form of a DC-free code trains. The modulating operation which is performed by the modulating circuit 42 may be carried out by an arbitrary means if the means is able to perform modulation into data in the form of the DC-free code trains.

Specifically, the modulation may be modulation for performing so-called 8–10 conversion such that data, to which the error correction code has been added and which has been formed into a block, is converted into 10-bit code data for each 8 bits so as to form DC-free code trains in which the spectrum in the low-frequency region is limited. As an alternative to this, modulation for performing so-called 8–9 conversion such that data, to which the error correction code has been added and which has been formed into a block, is converted into 9-bit code data for each 8 bits so as to form DC-free code trains in which the spectrum in the low-frequency region is limited. As an alternative to this, a mirror square (Miller$^2$) method may be employed.

Data in the form of the DC-free code trains output from the modulating circuit 42 is supplied to the recording amplifier 43 or the recording amplifier 44. The modulating circuit 42 supplies data to the recording amplifier 43 or the recording amplifier 44 in synchronization with the rotation of the rotational drum 3. That is, the modulating circuit 42 supplies data to the recording amplifier 43 which corresponds to the inductive magnetic head 5a at timing at which the inductive magnetic head 5a records data. At timing at which the inductive magnetic head 5b records data, the modulating circuit 42 supplies data to the recording amplifier 44 which corresponds to the inductive magnetic head 5b.

The recording amplifier 43, to which data in the form of the DC-free code trains has been supplied from the modulating circuit 42, amplifies the recording signal corresponding to data above to a predetermined level so as to supply the recording signal to the signal-transmission ring 26a of the stator core 26. Similarly, the recording amplifier 44, to which data in the form of the DC-free code trains has been supplied from the modulating circuit 42, amplifies the recording signal corresponding to data above to a predetermined level so as to supply the recording signal to the signal-transmission ring 26b of the stator core 26.

As described above, the pairwise inductive magnetic heads 5a and 5b are disposed to relatively make an angle of 180° with respect to the center of the rotational drum 3. Therefore, the inductive magnetic heads 5a and 5b alternately record data with a phase difference of 180°. That is, timing at which the recording signal is supplied from the recording amplifier 43 to the signal-transmission ring 26a corresponding to the inductive magnetic head 5a and timing at which the recording signal is supplied from the recording amplifier 44 to the signal-transmission ring 26b corresponding to the inductive magnetic head 5b are alternately switched with the phase difference of 180°.

The recording signal supplied to the signal-transmission ring 26a of the inductive magnetic head 5a is, in the non-contact manner, transmitted to the signal-transmission ring 27a of the rotor core 27. The recording signal transmitted to the signal-transmission ring 27a of the rotor core 27 is supplied to the inductive magnetic head 5a. Thus, the inductive magnetic head 5a records data on the magnetic tape 7.

Similarly, the recording signal supplied to the signal-transmission ring 26b corresponding to the inductive magnetic head 5b is, in the non-contact manner, transmitted to the signal-transmission ring 27b of the rotor core 27. The recording signal transmitted to the signal-transmission ring 27b of the rotor core 27 is supplied to the inductive magnetic head 5b. Thus, the inductive magnetic head 5b records data on the magnetic tape 7.

When the rotational drum unit 1 is operated to reproduce data from the magnetic tape 7, a process similar to that for recording data is performed such that an electric current is supplied to the operating coil 31 of the motor 4. Thus, the rotational drum 3 is rotated.

Figure 5:
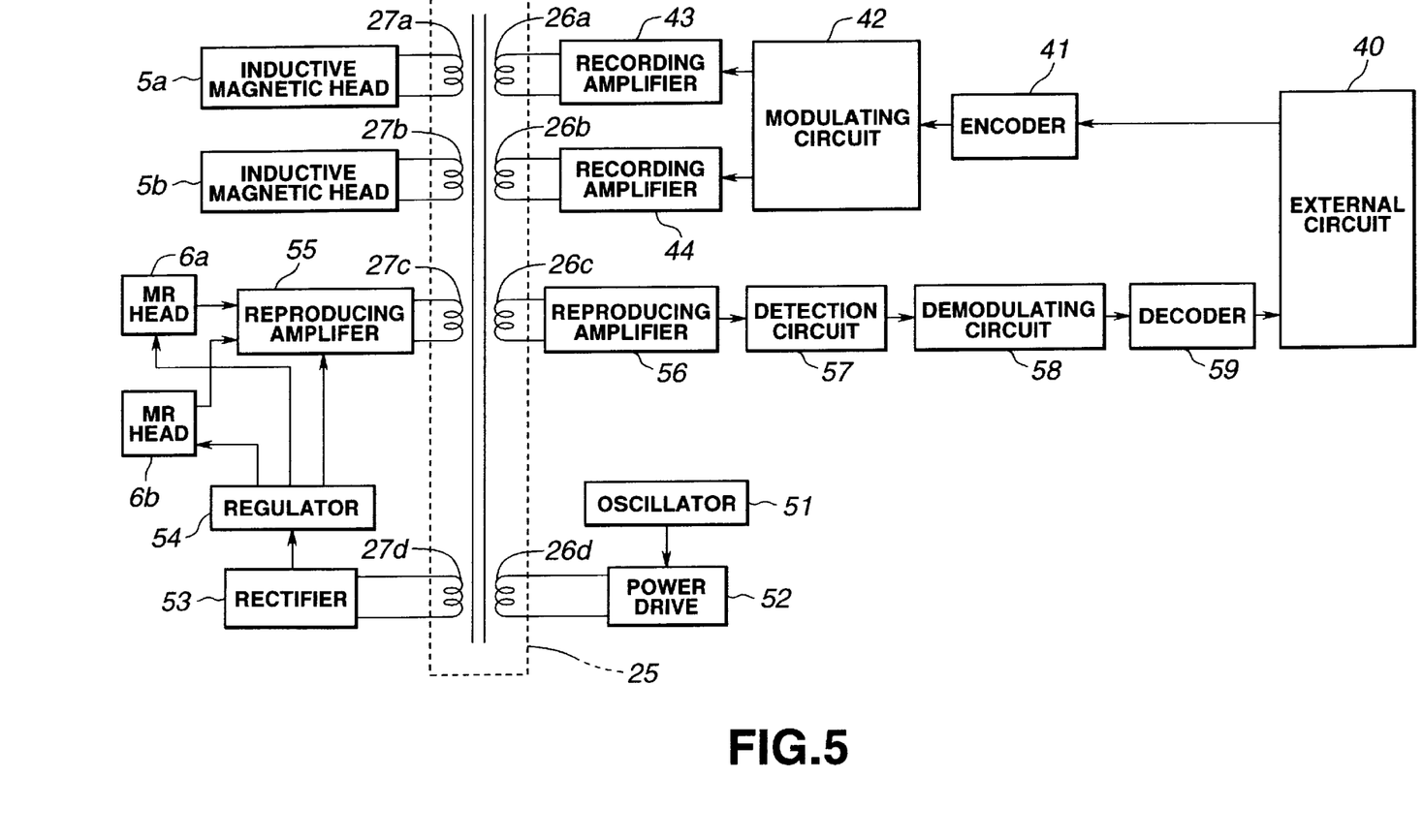
FIG. 5 is a diagram showing the schematic circuit structure of the rotational drum unit and its peripheral circuits.

In a state in which the rotational drum 3 is being rotated, a high-frequency electric current is supplied from an oscillator 51 to a power drive 52, as shown in FIG. 5. The high-frequency electric current supplied from the oscillator 51 is converted into a predetermined AC current by the power drive 52, and then supplied to the electric-power transmission ring 26d of the stator core 26.

The AC current supplied to the electric-power transmission ring 26d of the stator core 26 is, in the non-contact manner, transmitted to the electric-power transmission ring 27d of the rotor core 27. The AC current transmitted to the electric-power transmission ring 27d of the rotor core 27 is rectified by a rectifier 53 so as to be formed into a DC current which is supplied to a regulator 54. The foregoing AC current is set to a predetermined voltage level by the regulator 54.

The electric current set to the predetermined voltage level by the regulator 54 is, as a sense electric current, supplied to the pairwise MR heads 6a and 6b. Note that a reproducing amplifier 55 for detecting a signal transmitted from the MR heads 6a and 6b is connected to the pairwise MR heads 6a and 6b. Also the electric current supplied from the regulator 54 is supplied to the reproducing amplifier 55.

As described later, the MR beads 6a and 6b are provided with MR devices each having a resistance value which is changed in accordance with the intensity of an external magnetic field. The resistance values of the MR devices of the MR heads 6a and 6b are changed by the magnetic field of the signal generated by the magnetic tape 7. As a result, the voltage of the sense current is changed. The reproducing amplifier 55 detects the change in the voltage so as to output a signal corresponding to the change in the voltage as the recording signal.

Note that the reproducing amplifier 55 performs a switching operation in synchronization with the rotation of the rotational drum 3 when the reproducing amplifier 55 detects and outputs the reproduced signal. That is, the reproducing amplifier 55 outputs the recording signal detected by the MR bead 6a at timing at which the MR head 6a reproduces data. At timing at which the MR head 6b reproduces data, the reproducing amplifier 55 outputs the recording signal detected by the MR head 6b.

As described above, the pairwise MR heads 6a and 6b are disposed to make a relative angle of 180° with respect to the center of the rotational drum 3. Therefore, the MR heads 6a and 6b alternately perform reproduction with the phase difference of 180°. That is, the reproducing amplifier 55 alternately switches timing at which the reproduced signal is output from the MR head 6a and timing at which the reproduced signal is output from the MR head 6b with the phase difference of 180°.

The reproduced signal supplied from the reproducing amplifier 55 is supplied to the signal-transmission ring 27c of the rotor core 27. The reproduced signal is, in the non-contact manner, transmitted to the signal-transmission ring 26c of the stator core 26. The rotary transformer 25 attenuates the low-frequency components in the signal which must be transmitted and transmits only the high-frequency components. That is, the rotary transformer 25 transmits the signal in the non-contact manner and also serves as a high-pass filter.

Therefore, the reproduced signal detected by the MR heads 6a and 6b is formed into a signal containing no low-frequency component when the reproduced signal is transmitted from the signal-transmission ring 27c of the rotor core 27 to the signal-transmission ring 26c of the stator core 26. It leads to a fact that if thermal asperities are contained in the outputs from the MR heads 6a and 6b, the thermal asperities are removed when the reproduced signal is transmitted from the signal-transmission ring 27c to the signal-transmission ring 26c.

Since data in the form of the DC-free code trains is recorded on the magnetic tape 7, missing of data can be prevented if the low-frequency components are attenuated by the rotary transformer 25.

The reproduced signal transmitted to the signal-transmission ring 26c of the stator core 26 is supplied to the reproducing amplifier 56 so as to be amplified by the reproducing amplifier 56. Then, the reproduced signal is supplied to the detection circuit 57. The detection circuit 57 detects data in the form of code trains from the reproduced signal supplied to the reproducing amplifier 56. Data which is recorded on the magnetic tape 7 is data converted into the DC-free code trains. Therefore, data which is detected by the detection circuit 57 is data in the form of the DC-free code trains.

Data detected by the detection circuit 57 is supplied to the demodulating circuit 58 so as to be demodulated. If data has been subjected to, for example, 8–10 conversion by the modulating circuit 42 when data has been recorded, the demodulating circuit 58 performs opposite conversion, that is, 10–8 conversion of data detected by the detection circuit 57. If data has been subjected to, for example, 8–9 conversion by the modulating circuit 42 when data has been recorded, the demodulating circuit 58 performs an opposite conversion, that is, 9–8 conversion of data detected by the detection circuit 57. As described above, the demodulating circuit 58 serves as a demodulating means for demodulating data in a state before the conversion to the DC-free code trains from the reproduced signal, the low-frequency components of which have been attenuated by the rotary transformer 25 which serves as the high-pass filter.

Data demodulated by the demodulating circuit 58 is supplied to a decoder 59 so as to be decoded, and then output to the external circuit 40. The decoder 59 performs an error correction process in accordance with the error correction code added to data by the encoder 41 when data has been recorded. That is, the decoder 59 serves as an error correction means for performing an error correction process of data demodulated by the demodulating circuit 58 in accordance with the error correction code, the error correction process being performed in accordance with the error correction code.

The error correction process is performed as described above. Therefore, if foreign matter introduced between the MR heads 6a and 6b and the magnetic tape 7 has caused the reproduced signal to be missed, original data can be reproduced in a case where the quantity of missed reproduced signal is not large.

If the circuit is structured as shown in FIG. 5, the pairwise inductive magnetic heads 5a and 5b, the pairwise MR heads 6a and 6b, the rectifier 53, the regulator 54 and the reproducing amplifier 55 are mounted on the rotational drum 3 so as to be rotated together with the rotational drum 3. On the other hand, the encoder 41, the modulating circuit 42, the recording amplifiers 43 and 44, the oscillator 51, the power drive 52, the reproducing amplifier 56, the detection circuit 57, the demodulating circuit 58 and the decoder 59 are disposed in the stationary portion of the rotational drum unit 1 or formed into external circuits structured individually from the rotational drum unit 1.

Figure 6:
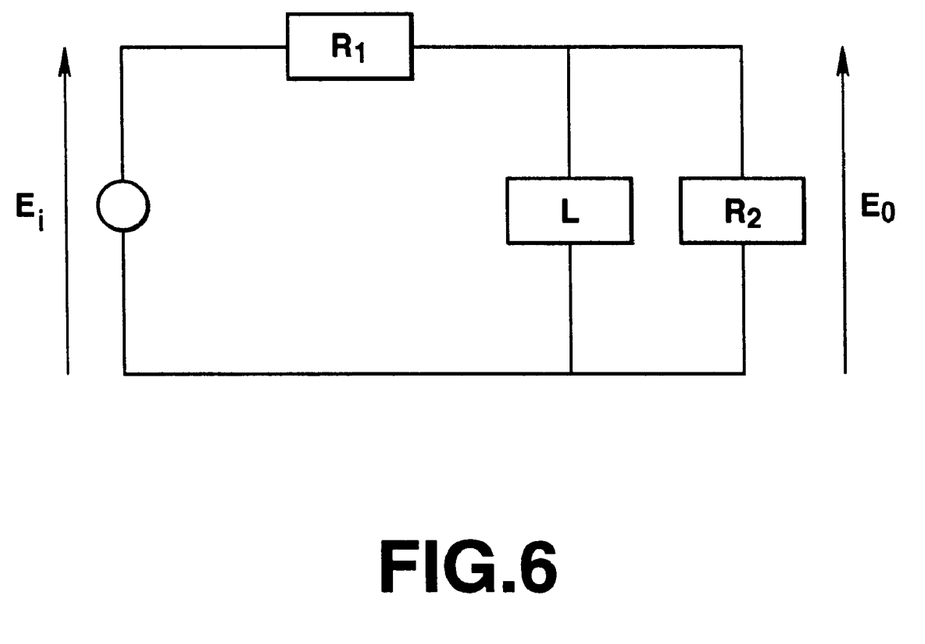
FIG. 6 is a diagram showing a circuit equivalent to a region from a reproducing amplifier connected to a rotational portion of a rotary transformer to an apparatus-side circuit connected to a stationary portion of the rotary transformer.

A portion of the circuits shown in FIG. 5 in a region from the reproducing amplifier 55 connected to the rotational portion of the rotary transformer 25 to the apparatus-side circuit connected to the stationary portion of the rotary transformer 25 is shown in FIG. 6.

Symbol $E_i$ is output voltage from the reproducing amplifier 55, $R_1$ is output resistance of the reproducing amplifier 55, L is a mutual inductance of the rotary transformer 25, $R_2$ is input resistance of the apparatus-side circuit connected to the stationary position of the rotary transformer 25 and $E_o$ is output voltage from the rotational drum unit 1.

Assuming that the frequency of the signal which must be transmitted is f, the input/output characteristic of the equivalent circuit can be expressed by the following equation (1):

$$E_o/E_t = (m^2 + p^2)^{-1/2} \quad (1)$$

where $m = (R_1 + R_2)/R_2$ and $p = R_1/(2\pi fL)$

Assuming that the cutoff gain is −3 dB from the peak, the input/output characteristic is expressed by the following equation (2) when $m = p_{(f=f1)}$, $$E_{o(f=f1)}/E_{o(f=\infty)} = -3\mathrm{dB} = 2^{-1/2} \quad (2)$$

Since m=p, the cutoff frequency $f_1$ in the low-frequency region can be expressed by the following equation (3):

$$f_1 = (R_1 R_2)/\{2\pi L(R_1 + R_2)\} \quad (3)$$

Therefore, the cutoff frequency $f_1$ in the low-frequency region is determined by $R_1$, L and $R_2$. That is, the output resistance $R_1$ of the reproducing amplifier 55 connected to the MR heads 6a and 6b, the mutual inductance L of the rotary transformer 25 and the input resistance $R_2$ of the apparatus-side circuit determine the cutoff frequency of the high-pass filter.

As a result, the foregoing values are adjusted to make the cutoff frequency of the high-pass filter to be not lower than the frequency of noise in the low-frequency (the thermal asperities) which is caused when the magnetic tape and the MR heads 6a and 6b are brought into contact with one another when the signal is reproduced.

Specifically, the frequency band of the thermal asperities is not higher than about $50 \times 10^3 [\mathrm{m}^{-1}] \times V$ [m/s] on an assumption that the relative speed between the MR heads 6a and 6b and the magnetic tape 7 is V [m/s]. Therefore, the values of $R_1$, $R_2$ and L are adjusted to cause the cutoff frequency $f_1$ of the high-pass filter satisfies the following equation (4):

$$f_1[\mathrm{Hz}] > 50 \times 10^3 \, [m^{-1}] \times V[\mathrm{m/s}] \quad (4)$$

As a result, noise in the low-frequency region (the thermal asperities) caused when the magnetic tape and the MR heads 6a and 6b are brought into contact with one another during the signal reproduction process can be removed. As a result, a signal in which the noise components are limited can be obtained. Note that the cutoff frequency $f_1$ of the high-pass filter is made to be not higher than the lowermost frequency of the band of the signal which must be recorded on the magnetic tape. As a result, undesirable attenuation of a required signal can be prevented.

In the example shown in FIG. 5, the rotary transformer 25 is employed as the high-pass filter. However, a high-pass filter may be provided individually from the rotary transformer 25. In the foregoing case, the high-pass filter may be disposed in a region from the MR heads 6a and 6b to the demodulating circuit 58. Also in the foregoing case, the thermal asperities can be removed from the reproduced signal similarly to the structure in which the rotary transformer 25 serves as the high-pass filter.

The MR heads 6a and 6b which are mounted on the rotational drum 3 will now be described with reference to FIGS. 7 and 8. Note that the MR heads 6a and 6b have the same structures except for the opposite azimuth angles. Therefore, the following description is performed such that the MR heads 6a and 6b are collectively called as MR head 6.

The MR head 6 is a magnetic head for detecting a magnetic signal from the magnetic tape 7 by using a magnetoresistance effect. In general, the MR head has superior sensitivity and greater reproduction output as compared with the inductive magnetic head which uses electromagnetic induction to record/reproduce data. Therefore, the MR head is suitable to perform a high density recording operation. Therefore, when the MR head 6 is employed as the recording magnetic head, a higher density recording operation can be performed.

Figure 7:
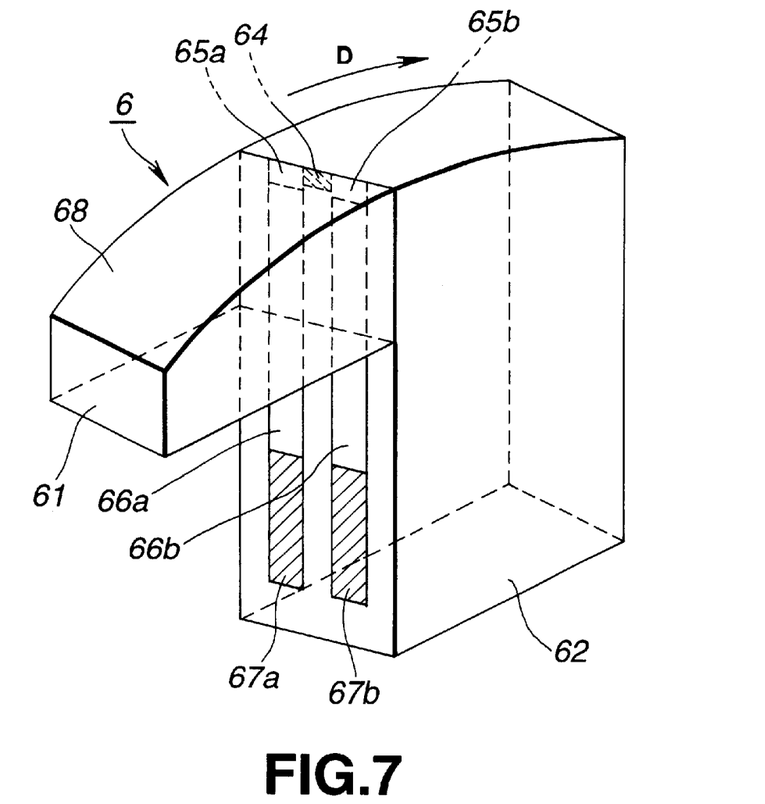
FIG. 7 is a perspective view showing an example of the MR head which is mounted on the rotational drum.
Figure 8:
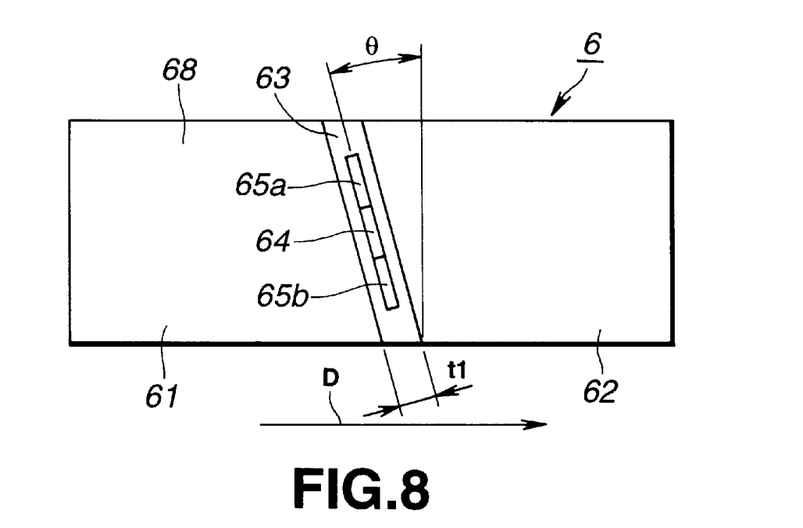
FIG. 8 is a plan view showing the MR head which is viewed from a surface on which a magnetic tape slides.

As shown in FIGS. 7 and 8, the MR head 6 incorporates pairwise magnetic shields 61 and 62 made of a soft magnetic material, such as Ni—Zn polycrystal ferrite; an MR-device portion 64 held by pairwise magnetic shields 61 and 62 through an insulator 63; permanent magnet films 65a and 65b disposed on the two sides of the MR-device portion 64; and conductor portions 66a and 66b connected to the permanent magnet films 65a and 65b. As shown in FIG. 8, the MR-device portion 64 is disposed to have a predetermined azimuth angle θ with respect to a sliding direction D of the MR head 6 with respect to the magnetic tape 7. Note that the insulator 63 is omitted in FIG. 7. FIG. 8 shows the MR-device portion 64 and its peripheral portion.

A gap between the magnetic shield 61 and the magnetic shield 62 is generally called a "reproduction gap". It is preferable that the width $t_1$ of the reproduction gap is determined to be adaptable to the wavelength of the signal recorded on the magnetic tape 7. Specifically, the foregoing width is about 0.1 μm to about 0.2 μm to raise the density of recording required in recent years.

The MR-device portion 64 of the MR head 6 is formed by laminating an MR device having the magnetoresistance effect, a SAL (Soft Adjacent Layer) and an insulating film disposed between the MR device and the SAL film.

The MR device is made of a soft magnetic material, such as Ni—Fe having the resistance value which is changed by the intensity of the external magnetic field. It is preferable that the thickness of the MR device is about 20 nm to about 60 nm. The saturation magnetization of the MR device made of Ni—Fe is about 600 emu/cm$^3$ to about 1000 emu/cm$^3$. The SAL film applies a vertical bias magnetic field to the MR device by a so-called SAL bias method. The MR device is made of a magnetic material, such as Permalloy, having large coercive force and high magnetic permeability. The insulating film insulates the MR device and the SAL film from each other to prevent an electrical shunt current loss. The insulating film is made of an insulating material, such as Ta.

The permanent magnet films 65a and 65b disposed on the two sides of the MR-device portion 64 apply a horizontal bias magnetic field to the MR device. The permanent magnet films 65a and 65b are disposed in contact with the two side surfaces of the MR device. Thus, a so-called abut structure is formed. The permanent magnet films 65a and 65b are made of a magnetic material, such as Co—Ni—Pt or Co—Cr—Pt, having large coercive force and conductivity.

The conductor portions 66a and 66b connected to the permanent magnet films 65a and 65b are formed on the side surfaces of the magnetic shield 62 such that the end portions of the conductor portions 66a and 66b are exposed to the outside. The ends of the conductor portions 66a and 66b are formed into terminals 67a and 67b which supply sense electric currents to the MR device from outside. That is, the MR device provided for the MR-device portion 64 is supplied with the sense electric currents from the terminals 67a and 67b through the conductor portions 66a and 66b and the permanent magnet films 65a and 65b.

The MR-device portion 64 of the MR head 6 has a substantially rectangular plan shape. The shorter axis of the MR-device portion 64 is made to be substantially vertical with respect to the magnetic-tape slide surface 68. Moreover, the MR-device portion 64 is held by the pairwise magnetic shields 61 and 62 through the insulator 63 to cause either side surface of the MR-device portion 64 to be exposed to the magnetic-tape slide surface 68.

The magnetic-tape slide surface 68 is cylindrically ground in the direction D in which the magnetic tape 7 and the MR head 6 are relatively slid to expose either side surface of the motor 4 to the magnetic-tape slide surface 68. Moreover, the magnetic-tape slide surface 68 is cylindrically ground in a direction perpendicular to the sliding direction D. That is, the magnetic-tape slide surface 68 of the MR head 6 is formed into a spherical shape such that the MR-device portion 64 and its peripheral portion project maximally. The MR head 6 is mounted on the rotational drum 3 such that the MR-device portion 64 having the MR device, which is the magnetic sensor portion, and its peripheral portion project over the outer surface of the rotational drum 3.

When the MR head 6 and the magnetic tape 7 are slid relatively, the magnetic tape 7 is mainly supported by the rotational drum 3 and an air flow generated owning to the rotation of the rotational drum 3. The MR head 6 having the MR-device portion 64 and its peripheral portion which project over the outer surface of the rotational drum 3 is made contact and slid with respect to the magnetic tape 7 such that the magnetic tape 7 forms a tent shape. As described above, the magnetic-tape slide surface 68 of the MR head 6 has been cylindrically ground to cause the MR-device portion 64 and its peripheral portion to maximally project. Moreover, the MR head 6 has been mounted on the rotational drum 3 such that the portion which has been cylindrically ground projects over the outer surface of the rotational drum 3. Therefore, the contact characteristic of the MR-device portion 64 with respect to the magnetic tape 7 can be improved.

Figure 9:
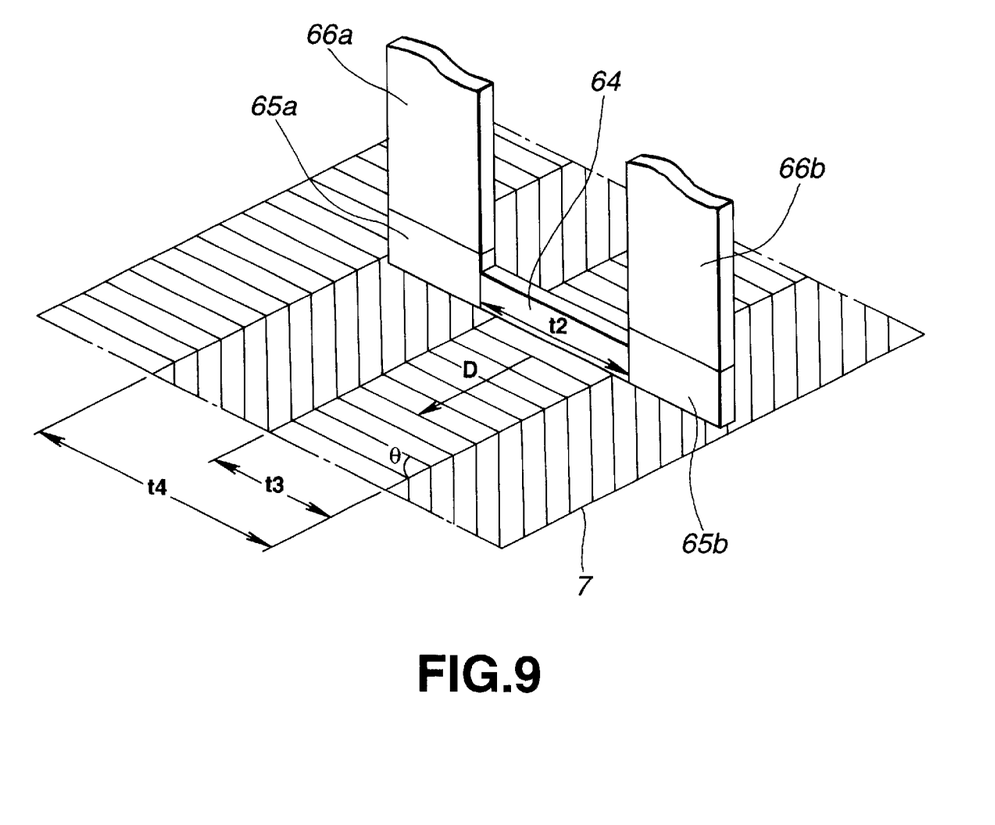
FIG. 9 is a schematic view showing a state in which the MR head is operated to reproduce data from the magnetic tape.

When the foregoing MR head 6 is operated to reproduce data from the magnetic tape 7, the magnetic tape 7 slides on the MR-device portion 64, as shown in FIG. 9. FIG. 9 is an enlarged schematic view showing the magnetic tape 7 on which data has been guard-band-less-recorded with a predetermined azimuth angle θ, the MR-device portion 64 of the MR head 6 which slides on the magnetic tape 7 and its peripheral portion. FIG. 9 schematically shows a state of a reproduction process which is performed by the MR head 6. The arrow D shown in FIG. 9 indicates a direction in which the MR head 6 slides on the magnetic tape 7.

When data is reproduced from the magnetic tape 7, a sense electric current is supplied to the MR device provided for the MR-device portion 64 through the permanent magnet films 65a and 65b connected to the two ends of the MR-device portion 64 and the conductor portions 66a and 66b in a state in which the magnetic tape 7 is being slid on the MR-device portion 64.

Specifically, the terminal 67a provided for the end portion of the conductor portion 66a is connected to the regulator 54. Then, a predetermined voltage is applied from the regulator 54 so as to supply the sense electric current. Moreover, the terminal 67b provided for the end portion of the conductor portion 66b is connected to the rotational drum 3. The rotational drum 3 is electrically connected to the stationary drum 2 through the rotational shaft 21. Moreover, the stationary drum 2 is grounded. Therefore, the terminal 67b provided for the end portion of the conductor portion 66b is grounded through the rotational drum 3, the rotational shaft 21 and the stationary drum 2.

When the sense electric current is supplied to the MR-device portion 64 in a state in which the magnetic tape 7 is being slid, the resistance value of the MR device provided for the MR-device portion 64 is changed in accordance with the magnetic field generated by the magnetic tape 7. As a result, the voltage of the sense current is changed. When change in the voltage of the sense current is detected, the magnetic field of the signal generated by the magnetic tape 7 is detected. As a result, data recorded on the magnetic tape 7 is reproduced.

The MR device for use in the MR head 6 may be a device having the magnetoresistance effect. For example, a so-called giant magnetoresistance effect device (a GMR device) may be employed which is formed by laminating a plurality of thin films to obtain higher magnetoresistance effect. The method of applying the bias magnetic field to the MR device is not limited to the SAL bias method. For example, any one of a variety of methods may be employed which include a permanent magnet bias method, a shunt current bias method, a self-bias method, and exchange bias method, a barber pole method, a division device method or a servo-bias method. As for the giant magnetoresistance effect and the various bias methods, refer to "BASE APPLICATION OF MAGNETORESISTANCE EFFECT HEAD", translated by Kazuhiko Hayashi and published by Maruzen.

When data recorded on the magnetic tape 7 by the MR head 6 is reproduced, the reproduced output is reduced if the width $t_2$ (hereinafter called a "recording head width $t_2$") of the magnetic sensor portion of the MR head 6 is smaller than the track width $t_3$ of the recording track. If the recording head width $t_2$ is larger than a total $t_4$ of the track widths of the two adjacent recording tracks, crosstalk occurs excessively. Therefore, as shown in FIG. 9, it is preferable that the recording head width $t_2$ is larger than the track width $t_3$ of the recording track on which data has been guard-band-less-recorded by the inductive magnetic heads 5a and 5b. Moreover, it is preferable that the recording head width $t_2$ is smaller than the total $t_4$ of the two adjacent recording tracks. When the reproducing head width $t_2$ is set as described above, a large reproduction output in which the crosstalk has been limited can be obtained.

The magnetic tape 7 for use in the recording/reproducing apparatus which incorporates the foregoing rotational drum unit 1 will now be described.

The magnetic tape 7 incorporates a non-magnetic support member having a structure that a plastic film is formed into a tape shape; and a magnetic layer formed on the non-magnetic support member.

It is preferable that the magnetic layer has coercive force of 1000 oersteds to 2000 oersteds, a squareness ratio of 0.6 to 0.9 and residual magnetization of 200 emu/cm$^3$ to 300 em/cm$^3$. As a magnetic layer which satisfies the foregoing characteristics, it is preferable that a metal magnetic layer made of a metal magnetic material is employed.

Specifically, it is preferable that an evaporating method, a sputtering method or an ion plating method is employed to form a ferromagnetic metal magnetic material, such as Co, Co—O, Co—Cr, Co—Ni, Co—Fe—Ni or Co—Ni—Cr on the non-magnetic support member. Note that the characteristics of the magnetic layer depend on the material and the forming method. That is, when the magnetic layer is formed by the evaporating method and the amount of oxygen introduced during the evaporating process is changed, the residual magnetization, the squareness ratio and so forth can be controlled.

There is a tendency that the reproduced output is enlarged in proportion to the thickness of the magnetic layer. Note that the foregoing effect can be improved until the thickness is about ¼ of the recording wavelength. In a case where the thickness is larger than ¼ of the recording wavelength, the reproduced output cannot considerably be enlarged if the thickness is enlarged. If the magnetic layer is too thick, there arises a problem in that the productivity deteriorates. Therefore, it is preferable that the thickness of the magnetic layer is about 20 nm to about 200 nm.

The magnetic layer may be formed by a single-layer film, a multilayer film obtained by laminating a plurality of thin films or a composite film obtained by laminating a plurality of thin films made of different materials.

The magnetic tape 7 is not required to be composed of the non-magnetic support member and the magnetic layer. That is, the magnetic layer may be formed after a base coating layer has been formed on the non-magnetic support member. As an alternative to this, a backcoat layer may be formed on the reverse side of the non-magnetic support member. Another structure may be employed in which a protective film for protecting the magnetic layer is formed on the magnetic layer. As an alternative to this, a top coat layer containing a lubricating material and a rust preventive material may be formed on the magnetic layer (on a protective film in a case where the protective film has been formed on the magnetic layer).

When the protective film is formed on the magnetic layer, the protective film may be a carbon-type thin film, such as a diamond-shape carbon thin film or a thin film made of $CrO_2$, $Al_2O_3$, BN, a Co oxide, MgO, $SiO_2$, $Si_3O_4$, $SiN_x$, SiC, $SiN_x$—$SiO_2$, $ZrO_2$, $TiO_2$ or TiC. From a viewpoint of improving the sliding characteristic between the MR head 6 and the magnetic tape 7, it is preferable that the protective film is a diamond-shape carbon thin film (a so-called DLC film) is employed. The protective film may be a single-layer film, a multi-layer film formed by laminating a plurality of thin films or a composite film formed by laminating a plurality of thin films made of different materials.

Figure 10:
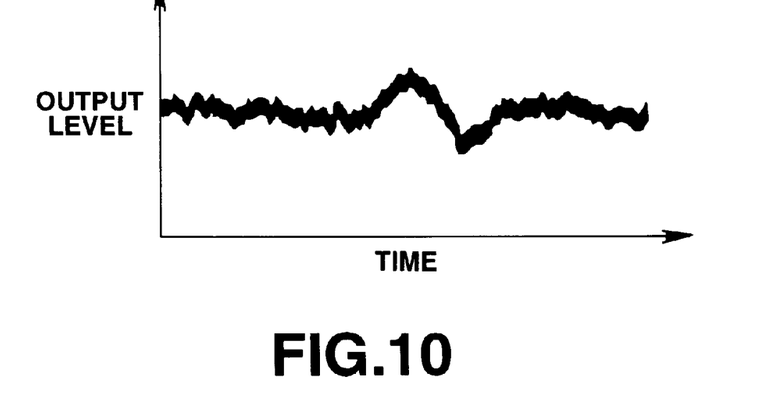
FIG. 10 is a graph showing an example of a signal reproduced by the MR head from a magnetic tape having no data recorded thereon in a state in which the signal has not been allowed to pass through a high-pass filter.
Figure 11:
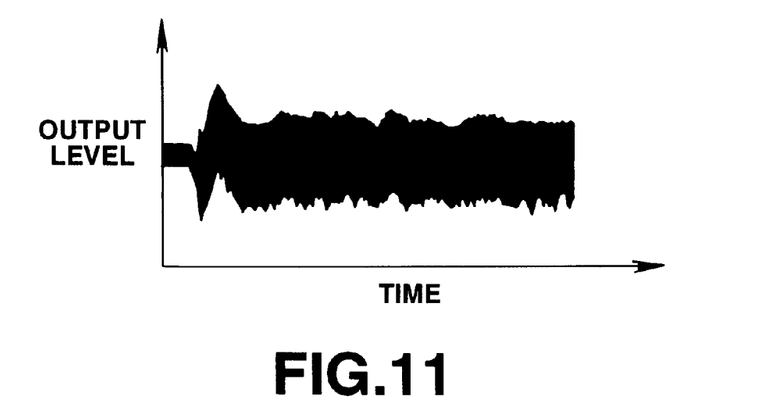
FIG. 11 is graph showing an example of a signal reproduced by the MR head from a magnetic tape having data recorded thereon in a state in which the signal has not been allowed to pass through a high-pass filter.
Figure 12:
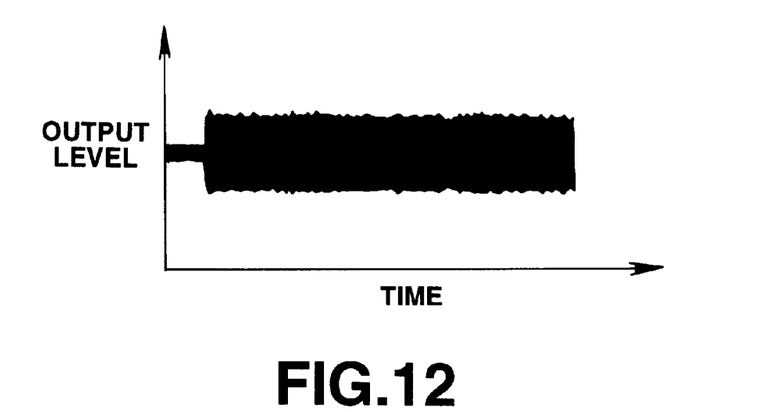
FIG. 12 is a graph showing an example of a signal reproduced by the MR head from a magnetic tape having data recorded thereon in a state in which the signal has been allowed to pass through a high-pass filter.

Finally, an output of a reproduced signal obtainable when the foregoing MR head 6 is employed to perform the helical scan method will now be described. Its specific example is shown in FIGS. 10 to 12. Note that the MR head 6 incorporated the MR device made of Ni—Fe. The width $t_1$ of the recording gap was 0.17 μm, the recording head width $t_2$ was 18 μm, the track width $t_3$ of the recording track was 11 μm, the azimuth angle θ was ±25° and the relative speed V between the MR head 6 and the magnetic tape 7 was 10 m/s.

FIG. 10 shows a reproduced signal obtained from the MR head 6 when the magnetic tape 7 on which no data has been recorded, FIG. 10 showing the signal in a state before the signal is passed through the high-pass filter. As shown in FIG. 10, the reproduced signal has relatively noticeable variations in the low-frequency region. The variations are mainly caused from thermal asperities.

FIG. 11 shows the reproduced signal obtained from the MR head 6 when the magnetic tape 7 on which data has been recorded, FIG. 10 showing the signal in a state before it is passed through the high-pass filter. FIG. 12 shows the reproduced signal after it has been passed through the high-pass filter. Note that the cutoff frequency of the high-pass filter was 500 kHz.

As shown in FIG. 11, the reproduced signal before it has been passed through the high-pass filter contains relatively low-frequency noise components. The foregoing fact is mainly caused from thermal asperities. When the reproduced signal is passed through the high-pass filter, the thermal asperities are removed from the reproduced signal. Thus, a satisfactory reproduced signal in which noise is limited can be obtained, as shown in FIG. 12.

It is preferable that the cutoff frequency of the high-pass filter is made to be about the uppermost frequency of the thermal asperities. Note that the cutoff frequency must be not higher than the lowermost frequency of the frequency band for the recording signal. Specifically, it is usually preferable that the cutoff frequency of the high-pass filter is about 500 kHz to 1000 kHz though it must be determined depending upon the relative speed between the MR head 6 and the magnetic tape 7 and so forth Industrial Applicability As described above, the magnetic recording/reproducing apparatus according to the present invention enables a stable reproduced output because thermal asperities can be removed form the reproduced signal. Therefore, according to the present invention, the MR head from which a high sensitivity and large reproduced signal can be obtained can be employed as the recording magnetic head which is mounted on the helical scan magnetic recording/reproducing apparatus. As a result, the recording density can furthermore be raised and the capacity can furthermore be enlarged.

What is claimed is:

1. A helical scan magnetic recording/reproducing apparatus comprising:

a magnetoresistance-effect magnetic head mounted on a rotational drum and arranged to detect a reproduced signal from a magnetic tape on which data converted into DC-free code trains has been recorded;

a high-pass filter for attenuating low-frequency components in the reproduced signal detected by said magnetoresistance-effect magnetic head;

demodulating means for demodulating data in a state before data has been converted into the DC-free code trains from the reproduced signal, the low-frequency components of which have been attenuated by said high-pass filter; and a rotary transformer for transmitting, to a stationary portion, the reproduced signal detected by said magnetoresistance-effect magnetic head mounted on said rotational drum, wherein a cutoff frequency of said high-pass filter which is determined by output resistance of a reproducing amplifier for amplifying the reproduced signal detected by said magnetoresistance-effect magnetic head, mutual inductance of said rotary transformer and input resistance of an apparatus-side circuit connected to the stationary portion of said rotary transformer is not lower than the frequency of noise in a low-frequency region which is generated when a magnetic tape and said magnetoresistance-effect magnetic head are brought into contact with each other during reproduction of the signal.

2. A magnetic recording/reproducing apparatus according to claim 1, wherein a cutoff frequency of said high-pass filter is not higher than the lowermost frequency of the band of a signal which is recorded on a magnetic tape.

3. A magnetic recording/reproducing apparatus according to claim 1, wherein when an assumption is made that a cutoff frequency of said high-pass filter is f [Hz] and relative speed between said magnetic tape and said magnetoresistance-effect magnetic head during reproduction of the signal is V [m/s], the following relationship is satisfied:

$$f[Hz] > 50 \times 10^3 [m^{-1}] \times V[m/s].$$

4. A magnetic recording/reproducing apparatus according to claim 1, wherein a cutoff frequency of said high-pass filter is 500 kHz or higher.

5. A magnetic recording/reproducing apparatus according to claim 1, data recorded on the magnetic tape is data to which an error correction code has been added, and error correction means is provided which subjects data demodulated by said demodulating means to an error correction process in accordance with the error correction code.

6. A magnetic recording/reproducing apparatus according to claim 1, further comprising:
 modulating means for modulating data, which is recorded on the magnetic tape, into data in the form of DC-free code trains; and
 a recording magnetic bead mounted on said rotational drum and arranged to record data modulated by said modulating means on a magnetic tape.

7. A magnetic recording/reproducing apparatus according to claim 6, further comprising error-code adding means for adding an error correction code to data which is recorded on the magnetic tape by said recording magnetic head.

8. A magnetic recording/reproducing apparatus according to claim 6, wherein pairwise magnetoresistance-effect magnetic heads to each of which a predetermined azimuth angle has been set are provided as said magnetoresistance-effect magnetic head,
 pairwise recording magnetic heads to each of which a predetermined azimuth angle has been set are provided as said recording magnetic head,
 when data is recorded on the magnetic tape, said pairwise recording magnetic heads perform guard-band-less recording when data is recorded on the magnetic tape, and
 when data is reproduced from the magnetic tape, said pairwise magnetoresistance-effect magnetic heads reproduce data guard-band-less-recorded by said pairwise recording magnetic heads.

9. A magnetic recording/reproducing apparatus according to claim 1, wherein said magnetoresistance-effect magnetic head incorporates a magnetic sensor which detects a magnetic field from the magnetic tape and which is a magnetoresistance effect device having a magnetoresistance effect, and said magnetoresistance-effect magnetic head is provided with a soft magnetic film laminated on said magnetoresistance effect device through an insulating film.

10. A magnetic recording/reproducing apparatus according to claim 1, wherein said magnetoresistance-effect magnetic head is mounted on said rotational drum such that at least a portion of said magnetoresistance-effect magnetic head projects over the outer surface of said rotational drum.

11. A magnetic recording/reproducing apparatus according to claim 1, wherein a magnetic-tape sliding surface of said magnetoresistance-effect magnetic head has been cylindrically ground in a sliding direction in which said magnetoresistance-effect magnetic head slides on the magnetic tape and cylindrically ground in a direction perpendicular to the sliding direction.

12. A magnetic recording/reproducing apparatus according to claim 1, further comprising contact-pressure control means for controlling contact pressure between the magnetic tape and said magnetoresistance-effect magnetic head.

13. A magnetic recording/reproducing apparatus according to claim 1, further comprising electric-power transmission means for supplying electric power to said magnetoresistance-effect magnetic head mounted on said rotational drum.

14. A magnetic recording/reproducing apparatus according to claim 1, wherein the magnetic tape is a magnetic tape having a metal magnetic layer formed on a non-magnetic support member thereof.

15. A magnetic recording/reproducing apparatus according to claim 1, wherein the magnetic tape is a magnetic tape having a carbon-type thin film formed on the surface thereof.

16. A helical scan magnetic recording/reproducing apparatus, comprising:
 a magnetoresistance-effect magnetic head mounted on a rotational drum and arranged to detect a reproduced signal from a magnetic tape on which data converted into DC-free code trains has been recorded;
 a high-pass filter for attenuating low-frequency components in the reproduced signal detected by said magnetoresistance-effect magnetic head;
 demodulating means for demodulating data in a state before data has been converted into the DC-free code trains from the reproduced signal, the low-frequency components of which have been attenuated by said high-pass filter;
 modulating means for modulating data, which is recorded on the magnetic tape, into data in the form of DC-free code trains; and
 a recording magnetic head mounted on said rotational drum and arranged to record data modulated by said modulating means on a magnetic tape;
 wherein pairwise magnetoresistance-effect magnetic heads to each of which a predetermined azimuth angle has been set are provided as said magnetoresistance-effect magnetic head;
 wherein pairwise recording magnetic heads to each of which a predetermined azimuth angle has been set are provided as said recording magnetic head;
 wherein when data is recorded on the magnetic tape, said pairwise recording magnetic heads perform guard-band-less recording when data is recorded on the magnetic tape;
 wherein when data is reproduced from the magnetic tape, said pairwise magnetoresistance-effect magnetic heads reproduce data guard-band-less recorded by said pairwise recording magnetic heads; and
 wherein the width of magnetic sensor portion of said magnetoresistance-effect magnetic head is larger than the track width of a recording track guard-band-less recorded by said recording magnetic head and smaller than the total of track widths of two adjacent recording tracks.

17. A helical scan magnetic recording/reproducing apparatus, comprising:
 a magnetoresistance-effect magnetic head mounted on a rotational drum and arranged to detect a reproduced signal from a magnetic tape on which data converted into DC-free code trains has been recorded;
 a high-pass filter for attenuating low-frequency components in the reproduced signal detected by said magnetoresistance-effect magnetic head; and
 demodulating means for demodulating data in a state before data has been converted into the DC-free code trains from the reproduced signal, the low-frequency components of which have been attenuated by said high-pass filter;
 wherein said magnetoresistance-effect magnetic head incorporates a magnetic sensor device which detects a magnetic field from the magnetic tape and which is held by pairwise magnetic shields.

18. A helical scan magnetic recording/reproducing apparatus, comprising:

a magnetoresistance-effect magnetic head mounted on a rotational drum and arranged to detect a reproduced signal from a magnetic tape on which data converted into DC-free code trains has been recorded;

a high-pass filter for attenuating low-frequency components in the reproduced signal detected by said magnetoresistance-effect magnetic head; and demodulating means for demodulating data in a state before data has been converted into the DC-free code trains from the reproduced signal, the low-frequency components of which have been attenuated by said high-pass filter;

wherein said magnetoresistance-effect magnetic head incorporates a magnetic sensor device which detects a magnetic field from the magnetic tape and which is a magnetoresistance effect device having a magnetoresistance effect and permanent magnets disposed on the two sides of said magnetoresistance effect device.

* * * * *